(12) United States Patent
Hollingsworth

(10) Patent No.: US 8,981,663 B2
(45) Date of Patent: Mar. 17, 2015

(54) DISCHARGE LAMP USING SPREAD SPECTRUM

(75) Inventor: Gregg Hollingsworth, Tempe, AZ (US)

(73) Assignee: Luxim Corporation, Santa Clara, CA (US)

( * ) Notice: Subject to any disclaimer, the term of this patent is extended or adjusted under 35 U.S.C. 154(b) by 1175 days.

(21) Appl. No.: 12/445,684

(22) PCT Filed: Oct. 16, 2007

(86) PCT No.: PCT/US2007/081455
§ 371 (c)(1),
(2), (4) Date: Nov. 3, 2010

(87) PCT Pub. No.: WO2008/127367
PCT Pub. Date: Oct. 23, 2008

(65) Prior Publication Data

US 2011/0037404 A1    Feb. 17, 2011

Related U.S. Application Data

(60) Provisional application No. 60/852,327, filed on Oct. 16, 2006.

(51) Int. Cl.
*H05B 41/24* (2006.01)
*H01J 65/04* (2006.01)
*H05B 41/28* (2006.01)

(52) U.S. Cl.
CPC ............ *H01J 65/04* (2013.01); *H05B 41/2806* (2013.01); *Y02B 20/22* (2013.01)
USPC .......................................................... 315/248

(58) Field of Classification Search
USPC ................................................ 315/248, 246
See application file for complete search history.

(56) References Cited

U.S. PATENT DOCUMENTS

| | | |
|---|---|---|
| 3,787,705 A | 1/1974 | Bolin et al. |
| 3,826,950 A | 7/1974 | Hruda et al. |

(Continued)

FOREIGN PATENT DOCUMENTS

| | | |
|---|---|---|
| EP | 0621743 A1 | 10/1994 |
| EP | 0890977 A1 | 1/1999 |

(Continued)

OTHER PUBLICATIONS

"Chapter 4—Cavity Resonators, Army Technical Manual, TM 11-673—Generation and Transmission of Microwave Energy", (Jun. 1953), 12 pgs.

(Continued)

*Primary Examiner* — Tung X Le
*Assistant Examiner* — Jonathan Cooper
(74) *Attorney, Agent, or Firm* — Schwegman Lundberg & Woessner, P.A.

(57) ABSTRACT

An electrodeless plasma lamp and a method of generating light are described. The lamp may comprise a lamp body including a dielectric material having a relative permittivity greater than 2. A lamp drive circuit is coupled to the lamp body and configured to provide radio frequency (RF) power to the lamp body. A bulb containing a fill is positioned proximate the lamp body. The fill forms a plasma when the RF power is coupled to the fill from the lamp body. A lamp drive circuit including modulation control circuit is provided to control modulation of a frequency of the RF power across a frequency band. The circuit may be configured to provide RF power across a frequency band around a resonant frequency for the lamp body to reduce peak amplitude and electromagnetic interference while maintaining average power to the plasma.

24 Claims, 9 Drawing Sheets

(56) References Cited

U.S. PATENT DOCUMENTS

| | | |
|---|---|---|
| 4,001,631 A | 1/1977 | McNeill et al. |
| 4,206,387 A | 6/1980 | Kramer et al. |
| 4,485,332 A | 11/1984 | Ury et al. |
| 4,498,029 A | 2/1985 | Yoshizawa et al. |
| 4,633,140 A | 12/1986 | Lynch et al. |
| 4,749,915 A | 6/1988 | Lynch et al. |
| 4,795,658 A | 1/1989 | Kano et al. |
| 4,887,192 A | 12/1989 | Simpson et al. |
| 4,950,059 A | 8/1990 | Roberts |
| 4,975,625 A | 12/1990 | Lynch et al. |
| 4,978,891 A | 12/1990 | Ury |
| 5,039,903 A | 8/1991 | Farrall |
| 5,070,277 A | 12/1991 | Lapatovich |
| 5,072,157 A | 12/1991 | Greb et al. |
| 5,086,258 A | 2/1992 | Mucklejohn et al. |
| 5,243,261 A | 9/1993 | Bergervoet et al. |
| 5,361,274 A | 11/1994 | Simpson et al. |
| 5,438,242 A | 8/1995 | Simpson |
| 5,448,135 A | 9/1995 | Simpson |
| 5,498,937 A | 3/1996 | Korber et al. |
| 5,525,865 A | 6/1996 | Simpson |
| 5,594,303 A | 1/1997 | Simpson et al. |
| 5,786,667 A | 7/1998 | Simpson et al. |
| 5,834,904 A | 11/1998 | Waymouth |
| 5,910,710 A | 6/1999 | Simpson |
| 5,910,754 A | 6/1999 | Simpson et al. |
| 5,923,116 A | 7/1999 | Mercer et al. |
| 6,020,800 A | 2/2000 | Arakawa et al. |
| 6,031,333 A | 2/2000 | Simpson |
| 6,049,170 A | 4/2000 | Hochi et al. |
| 6,124,680 A | 9/2000 | Shoji et al. |
| 6,137,237 A | 10/2000 | MacLennan et al. |
| 6,246,160 B1 | 6/2001 | MacLennan et al. |
| 6,252,346 B1 | 6/2001 | Turner et al. |
| 6,265,813 B1 | 7/2001 | Knox et al. |
| 6,313,587 B1 | 11/2001 | MacLennan et al. |
| 6,424,099 B1 | 7/2002 | Kirkpatrick et al. |
| 6,566,817 B2 | 5/2003 | Lapatovich |
| 6,617,806 B2 | 9/2003 | Kirkpatrick et al. |
| 6,666,739 B2 | 12/2003 | Pothoven et al. |
| 6,737,809 B2 | 5/2004 | Espiau et al. |
| 6,856,092 B2 | 2/2005 | Pothoven et al. |
| 6,905,216 B2 | 6/2005 | Stanton et al. |
| 6,922,021 B2 | 7/2005 | Espiau et al. |
| 7,034,464 B1 | 4/2006 | Izadian et al. |
| 7,050,122 B2 | 5/2006 | Gibbon et al. |
| 7,291,985 B2 | 11/2007 | Espiau et al. |
| 7,348,732 B2 | 3/2008 | Espiau et al. |
| 7,358,678 B2 | 4/2008 | Espiau et al. |
| 7,362,054 B2 | 4/2008 | Espiau et al. |
| 7,362,055 B2 | 4/2008 | Espiau et al. |
| 7,362,056 B2 | 4/2008 | Espiau et al. |
| 7,372,209 B2 | 5/2008 | Espiau et al. |
| 7,391,158 B2 | 6/2008 | Espiau et al. |
| 7,429,818 B2 | 9/2008 | Chang et al. |
| 2001/0035720 A1 | 11/2001 | Guthrie et al. |
| 2005/0179401 A1* | 8/2005 | Stockwald ............... 315/209 R |
| 2005/0212456 A1 | 9/2005 | Espiau et al. |
| 2005/0248281 A1* | 11/2005 | Espiau et al. ................. 315/39 |
| 2005/0280372 A1* | 12/2005 | Anderson ............... 315/111.21 |
| 2005/0286263 A1* | 12/2005 | Champion et al. ............ 362/558 |
| 2006/0038496 A1* | 2/2006 | Michael et al. .............. 313/643 |
| 2006/0175984 A1* | 8/2006 | Okamoto et al. ............ 315/307 |
| 2006/0250090 A9 | 11/2006 | Guthrie et al. |
| 2007/0109069 A1 | 5/2007 | Espiau et al. |
| 2008/0211971 A1 | 9/2008 | Pradhan |

FOREIGN PATENT DOCUMENTS

| | | |
|---|---|---|
| JP | 8148127 | 6/1996 |
| JP | 2001266803 A | 9/2001 |
| JP | 2003249197 A | 9/2003 |
| KR | 1020050018587 A | 2/2005 |
| WO | WO-2005072023 A1 | 8/2005 |
| WO | WO-2006044091 A1 | 4/2006 |
| WO | WO-2006070190 A1 | 7/2006 |
| WO | WO-2006129102 A2 | 12/2006 |
| WO | WO-2007138276 A2 | 12/2007 |
| WO | WO-2008127367 A2 | 10/2008 |
| WO | WO-2008127367 A3 | 10/2008 |

OTHER PUBLICATIONS

"Chapter 6.3—Rectangular Waveguide Cavities", in: Microwave Engineering, Pozar, D. M., Editor (John Wiley & Sons, Inc.), (Jul. 1997), pp. 313-318.

"International Application Serial No. PCT/US2007/081455, International Search Report mailed on Sep. 19, 2008", 12 pgs.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp Is Built Into the Wave-Guide Structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", Guthrie Exhibit 2173, Board of Patent Appeals and Interferences (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, and Don Wilson, 16 pgs.

Guthrie, Charles, "LAMP", U.S. Appl. No. 60/687,458, filed Jun. 6, 2005, 12 pgs.

Guthrie, Charles, et al., "LAMP", U.S. Appl. No. 60/687,280, filed Jun. 3, 2005, and Neate, 17 pgs.

Inventors Not Listed, "LAMP", International Application Serial No. PCT_GB2007_001935, International filed May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", In: Microwave Engineering, 3rd Edition, 2005 (John Wiley & Sons, Inc.), (2005), 9 pgs.

Pozar, D. M., "Section 6.4, Circular Waveguide Cavities", in: Microwave Engineering, 3rd Edition, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That Is Integrated Into a Waveguide", U.S. Appl. No. 60/262,536, filed Jan. 17, 2001, 6 pgs.

Sandberg, E., "An Improved Drive Circuit for an Electrode-Less Plasma Lamp That Is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", in: Lamps & Lighting, 4th Edition, 1997 (Arnold & John Wiley & Sons, Inc., (1997), 13 pgs.

Wharmby, D. O., "Electrodeless Lamps for Lighting: A Review", IEEE Proceedings-A, vol. 140 (6), (Nov. 1993), 9 pgs.

(56) References Cited

OTHER PUBLICATIONS

Wilson, D et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That Is Integrated Into a Wave-Guide", U.S. Appl. No. 60/224,289, filed Aug. 10, 2000, 6 pgs.

Wilson, D., et al., "Means to Reduce EMI in a Wave-Guide", U.S. Appl. No. 60/224,503, filed Aug. 10, 2000, 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

"European Application Serial No. 07873533.9, Extended European Search Report mailed Mar. 21, 2014", 9 pgs.

"International Application Serial No. PCT/US2007/081455, International Preliminary Report of Patentabitlity mailed on Apr. 30, 2009", 8 pgs.

\* cited by examiner

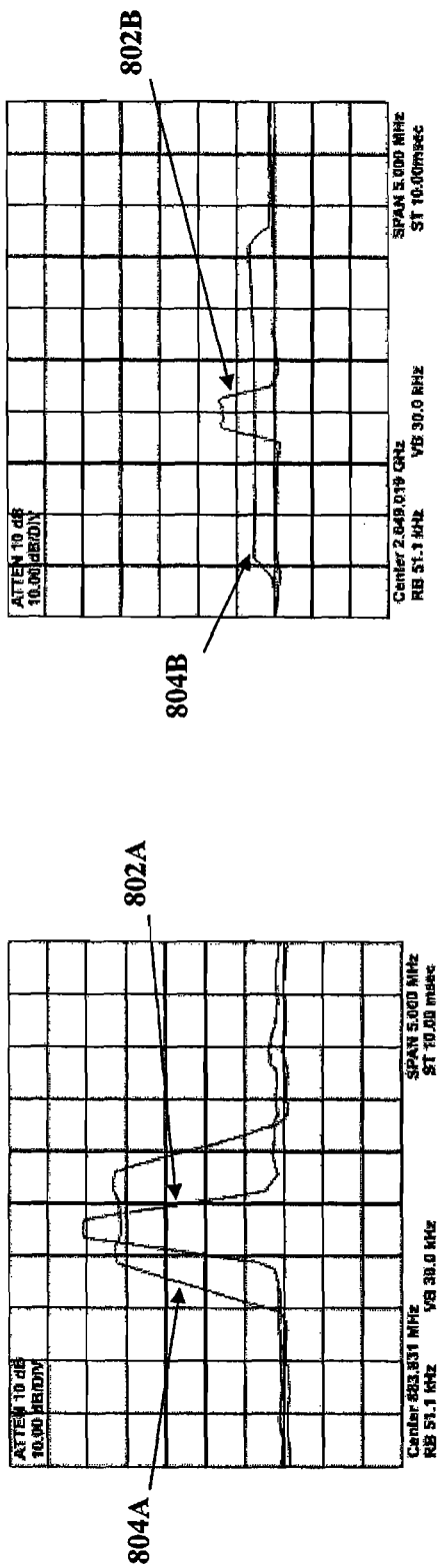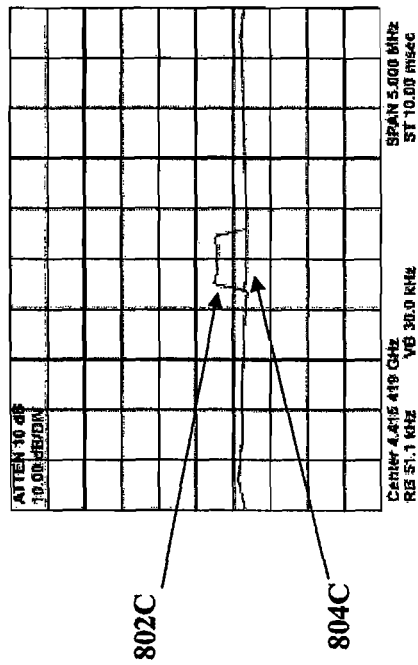
FIG. 8A
FIG. 8B
FIG. 8C

DISCHARGE LAMP USING SPREAD SPECTRUM

CLAIM OF PRIORITY

This application is a U.S. National Stage Filing under 35 U.S.C. 371 from International Application No. PCT/US2007/081455, filed Oct. 16, 2007 and published in English as WO 2008/127367 A2 on Oct. 23, 2008, and republished as WO 2008/127367 A3 on Dec. 18, 2008, which claims the benefit of the filing date of U.S. Provisional Patent Application Ser. No. 60/852,327 filed Oct. 16, 2006, entitled, "DISCHARGE LAMP USING SPREAD SPECTRUM," which priority is hereby claimed under 35 U.S.C. §119(e), which applications are incorporated herein by reference in their entirety.

BACKGROUND

1. Field

The field relates to systems and methods for generating light, and more particularly to radio frequency powered discharge lamps.

2. Background

ElectroMagnetic Interference (EMI) is caused by the generation and radiation of unwanted radio frequency signals that can interfere with other RF and wireless apparatus. In the United States, the FCC has stringent rules on the amount of radiated and conducted emission that a system may have. These regulations address peak emissions rather than average emissions at a particular frequency.

Some methods of EMI reduction include shielding the system inside a conductive enclosure, filtering the signal and power lines into and out of the system, and using gasketing seals to prevent "leaks" at enclosure seams. In some radio frequency discharge lamps, an opening is provided to allow the visible light to be emitted. Unfortunately, this opening may also allow EMI to radiate out.

What is desired are improved systems and methods for reducing peak EMI emission without blocking light output from a lamp. What is also desired are improved systems and methods for complying with FCC regulations and other requirements regarding EMI emissions. What is also desired are improved systems and methods for controlling radio frequency power provided to a high intensity discharge lamp.

SUMMARY

Example embodiments provide systems and methods for controlling radio frequency power in discharge lamps and other electronic devices.

Example embodiments also provide systems and methods for producing light in a plasma lamp.

Example embodiments use spread spectrum frequency to provide power to a radio frequency (RF) plasma lamp. In some embodiments, the peak RF power at a particular frequency may be reduced while providing substantially the same total average power to plasma. In some examples the peak RF power is reduced by about 5-15 dB or any range subsumed therein.

In example embodiments, a radio frequency (RF) feed is coupled to the lamp body to provide power for ignition and steady state operation of a plasma lamp. Feedback is used to adjust frequency in response to changing conditions of the lamp during startup. A phase shifter is used to adjust the phase of the power between ignition and steady state operation.

In some example embodiments, the phase shift in a feedback loop may be modulated in order to modulate the RF power provided to a plasma lamp.

In some example embodiments, RF power is provided across a band of frequencies at or near a resonant frequency for a plasma lamp. In some embodiments, the band is in the range of about 750 KHz to 10 MHz or any range subsumed therein. In one example, the band is about 1 Mhz.

Example embodiments also provide for modulating the frequency of RF power to reduce the peak amplitude at harmonics for an amplifier or other power supply circuit.

Example embodiments also provide for a periodic signal to be used to modulate the frequency of RF power. In some embodiments, the signal may be a sawtooth wave or sine wave. In some embodiments, the frequency of the signal (and frequency of modulation) is more than 1 KHz and may be in the range of from 10-100 KHz or any range subsumed therein. In some examples, the frequency of the modulation signal is in the range of about 20-30 KHz. In some examples, the period of the signal may be in the range of about 10 microseconds to 1 millisecond or any range subsumed therein.

In some example embodiments, the frequency of RF power is modulated across a bandwidth of about 1-10 MHz or any range subsumed therein. In some examples, the bandwidth is in the range of about 1-3 MHz or any range subsumed therein. In some embodiments, the frequency band is centered at or near a resonant frequency for the lamp. In some embodiments, the frequency band is centered at or near an harmonic frequency for an amplifier or other power supply circuit.

In some embodiments, an amplifier is used to provide RF power to a plasma lamp and is capable of being tuned to a frequency at or near a fundamental frequency for the lamp. In some examples, the bandwidth (at −3 dB) of the RF power around this frequency would be about 100 KHz to 1 MHz or less in the absence of active control to modulate the frequency of the RF power. In some embodiments, the frequency is actively controlled to modulate the frequency across a wider bandwidth to reduce peak amplitude and maintain about the same average power to the plasma. In some embodiments, the bandwidth (at −3 dB) of the RF power is spread by 1-10% of the unmodulated harmonic frequency or any range subsumed therein. In some embodiments, the frequency is modulated by adjusting the phase shift in a feedback loop. In some embodiments, the peak amplitude is reduced by 1-12 dB or any range subsumed therein while maintaining average power. In some examples, the peak amplitude is reduce by 8-10 dB.

It is understood that each of the above aspects of example embodiments may be used alone or in combination with other aspects described above or in the detailed description below. A more complete understanding of example embodiments and other aspects and advantages thereof will be gained from a consideration of the following description read in conjunction with the accompanying drawing figures provided herein. In the figures and description, numerals indicate the various features of example embodiments, like numerals referring to like features throughout both the drawings and description.

BRIEF DESCRIPTION OF THE DRAWINGS

FIGS. 8A, 8B and 8C show example changes in frequency band at the fundamental, third and fifth harmonics, respectively, of an RF-powered electrode-less lamp according to an example embodiment.

DETAILED DESCRIPTION

Figure 1A:
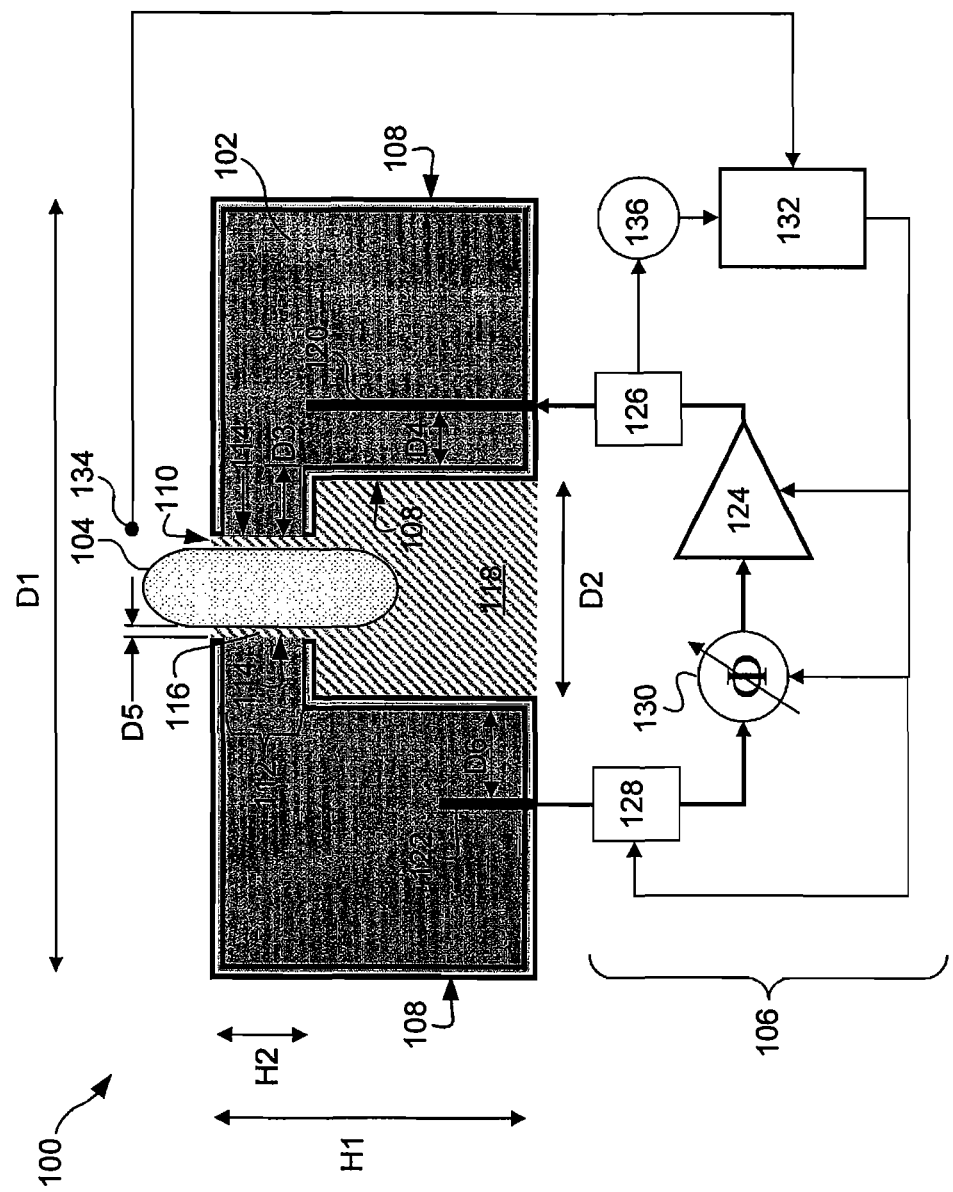
FIG. 1A is a cross-section and schematic view of a plasma lamp according to an example embodiment.

While the present invention is open to various modifications and alternative constructions, the embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

Figure 1B:
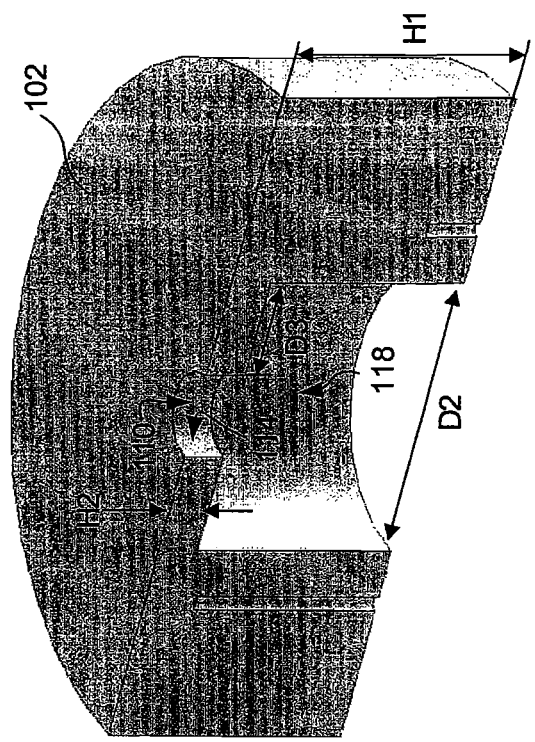
FIG. 1B is a perspective cross section view of a lamp body with a cylindrical outer surface according to an example embodiment.

Example embodiments provide for frequency modulation in RF powered plasma lamps. FIG. 1A is a cross-section and schematic view of an example electrodeless plasma lamp 100 that may be used in connection with an example embodiment. FIG. 1B is a perspective cross section view of a lamp body 102 that may be used in lamp 100. This is an example only and other plasma lamps may be used with other embodiments, including microwave, capacitive or inductive plasma lamps or other high intensity discharge lamps. Some embodiments of the present invention may also be used in other RF powered electronic devices where it is desirable to spread the frequency spectrum and/or reduce the peak RF amplitude.

In the example of FIG. 1A, the plasma lamp may have a lamp body 102 formed from one or more solid dielectric materials and a bulb 104 positioned adjacent to the lamp body. The bulb contains a fill that is capable of forming a light emitting plasma. A lamp drive circuit 106 couples radio frequency power into the lamp body 102 which, in turn, is coupled into the fill in the bulb 104 to form the light emitting plasma. In example embodiments, the lamp body 102 forms a waveguide that contains and guides the radio frequency power. In example embodiments, the radio frequency power may be provided at or near a frequency that resonates within the lamp body 102. This is an example only and some embodiments may use a different electrodeless plasma lamp, such as a capacitively or inductively coupled plasma lamp, or other high intensity discharge lamp.

Lamp 100 has a drive probe 120 inserted into the lamp body 102 to provide radio frequency power to the lamp body 102. In the example of FIG. 1A, the lamp also has a feedback probe 122 inserted into the lamp body 102 to sample power from the lamp body 102 and provide it as feedback to the lamp drive circuit 106. A lamp drive circuit 106 including a power supply, such as amplifier 124, may be coupled to the drive probe 120 to provide the radio frequency power. The amplifier 124 may be coupled to the drive probe 120 through a matching network 126 to provide impedance matching. In an example embodiment, the lamp drive circuit 106 is matched to the load (formed by the lamp body, bulb and plasma) for the steady state operating conditions of the lamp. The lamp drive circuit 106 is matched to the load at the drive probe 120 using the matching network 126.

In example embodiments, radio frequency power may be provided at a frequency in the range of between about 50 MHz and about 10 GHz or any range subsumed therein. The radio frequency power may be provided to drive probe 120 at or near a resonant frequency for lamp body 102. The frequency may be selected based on the dimensions, shape and relative permittivity of the lamp body 102 to provide resonance in the lamp body 102. In example embodiments, the frequency is selected for a fundamental resonant mode of the lamp body 102, although higher order modes may also be used in some embodiments. In example embodiments, the RF power may be applied at a resonant frequency or in a range of from 0% to 10% above or below the resonant frequency or any range subsumed therein. In some embodiments, RF power may be applied in a range of from 0% to 5% above or below the resonant frequency. In some embodiments, power may be provided at one or more frequencies within the range of about 0 to 50 MHz above or below the resonant frequency or any range subsumed therein. In another example, the power may be provided at one or more frequencies within the resonant bandwidth for at least one resonant mode. The resonant bandwidth is the full frequency width at half maximum of power on either side of the resonant frequency (on a plot of frequency versus power for the resonant cavity).

In example embodiments, the radio frequency power causes a light emitting plasma discharge in the bulb. In example embodiments, power is provided by RF wave coupling. In example embodiments, RF power is coupled at a frequency that forms a standing wave in the lamp body (sometimes referred to as a sustained waveform discharge or microwave discharge when using microwave frequencies). In other embodiments, a capacitively coupled or inductively coupled electrodeless plasma lamp may be used. Other high intensity discharge lamps may be used in other embodiments.

Figure 2:
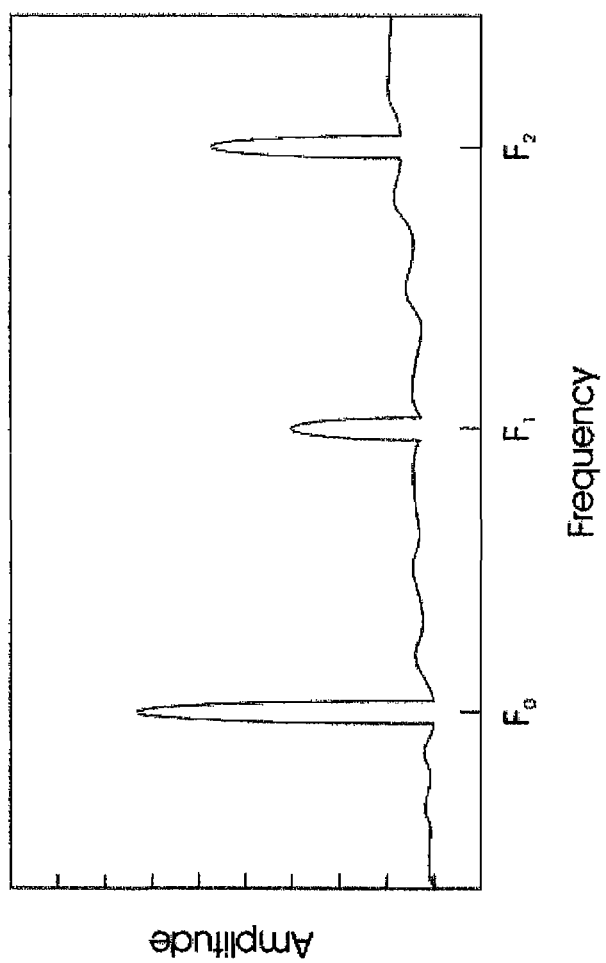
FIG. 2 shows an example EMI spectrum from an RF-powered electrode-less lamp.

FIG. 2 shows an example of a spectrum for a plasma lamp of the type shown in FIG. 1 when the frequency is not actively modulated. In one example, the fundamental harmonic frequency, $F_0$, is about 880 MHz, the second harmonic, $F_1$, is about 1760 MHz and the third harmonic, $F_2$, is about 2640 MHz. In this example, the unwanted EMI consists of a fraction of the power driving the lamp; therefore, it shares the same spectrum. Because the system is inherently resonant in some embodiments, all of the power of the signal is located over a very narrow frequency range. In some embodiments, the bandwidth (at −3 dB) of each harmonic is less than about 1 MHz and may be in the range of about 100-200 kHz or less. The total power delivered to the plasma is the area under the spectrum, and may be a design requirement for a given lamp in example embodiments. For a given power required, therefore, the narrower the frequency in which the power is distributed, the higher the peak value of each spectral component.

Figure 3:
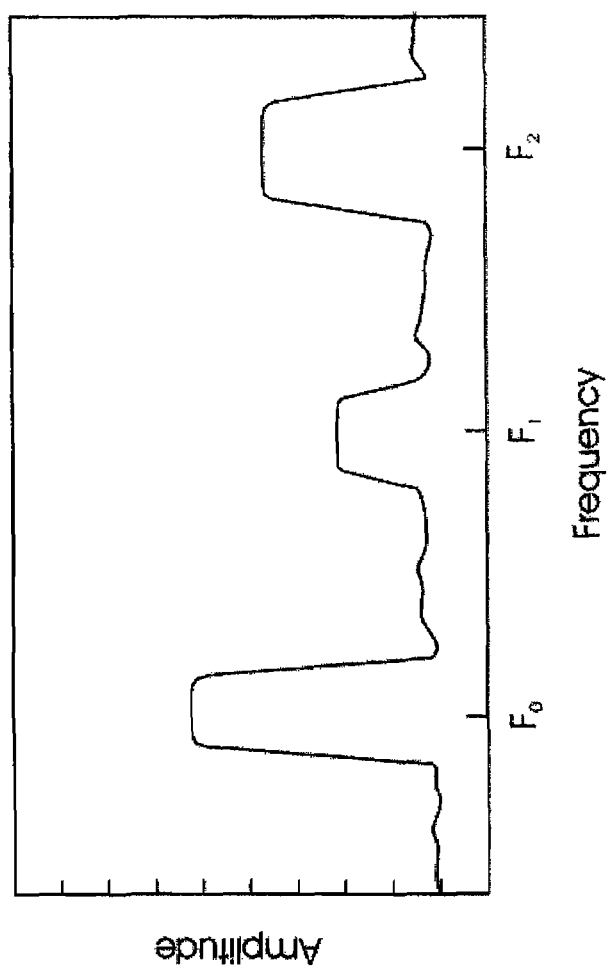
FIG. 3 shows the EMI spectrum of FIG. 2 with the power in each mode spread over a wider frequency band.

Since the more stringent FCC requirement is on peak power at any one frequency, it may be advantageous to spread the power over a larger bandwidth. FIG. 3 shows such a spectrum. In this example, the harmonics are centered at about the same frequencies as in FIG. 2. However, the peak amplitude is reduced and the bandwidth of the frequency around each harmonic is wider. As a result, average power delivered to the lamp may be maintained while peak amplitude is reduced.

In some example embodiments, the frequency of RF power is modulated across a bandwidth (at −3 dB) in the range of about 750 kHz to 10 MHz or any range subsumed therein. In some examples, the bandwidth is in the range of about 1-3 MHz or any range subsumed therein. In some embodiments, the bandwidth is 5-100 times (or any range subsumed therein) greater than the unmodulated bandwidth. In some embodiments, the bandwidth of the RF power is spread by 1-10% of the unmodulated harmonic frequency or any range subsumed therein. In some embodiments, the peak amplitude is reduced by 1-12 dB or any range subsumed therein while maintaining average power. In some examples, the peak amplitude is reduced by 8-10 dB. In example embodiments, the degree of spectral spreading and reduction in peak amplitude is sufficient to be effective in reducing EMI, but is essentially unperceived by the plasma.

Figure 4A:
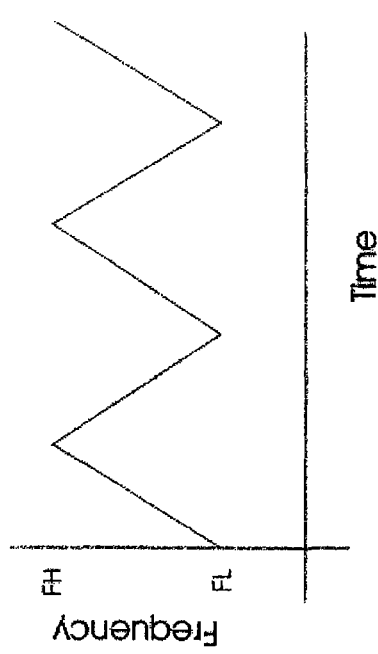
FIGS. 4A and 4B show time and frequency domain representation of an example frequency sweep to spread the energy in a mode contained between the frequency limits of the sweep.
Figure 4B:
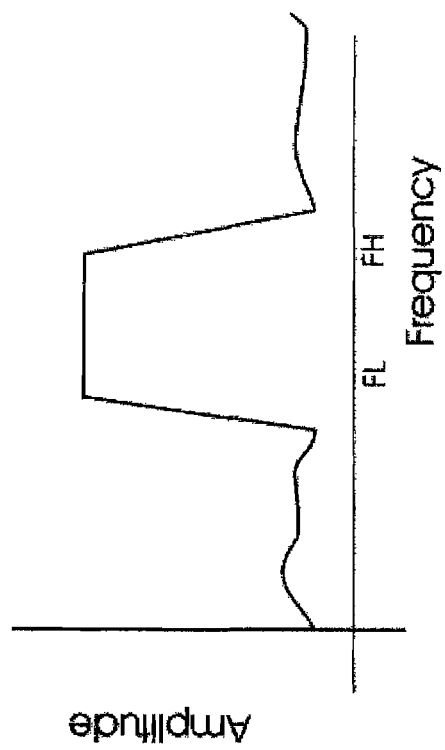
Figure 5A:
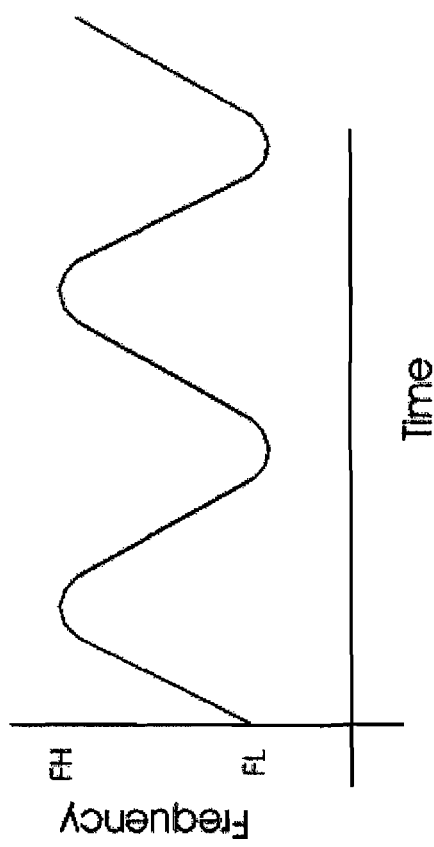
FIGS. 5A and 5B show time and frequency domain representation of an alternate frequency sweep.
Figure 5B:
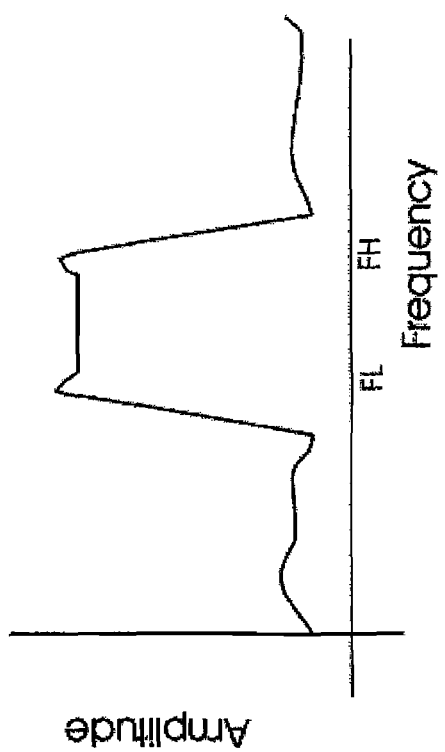
Figure 6:
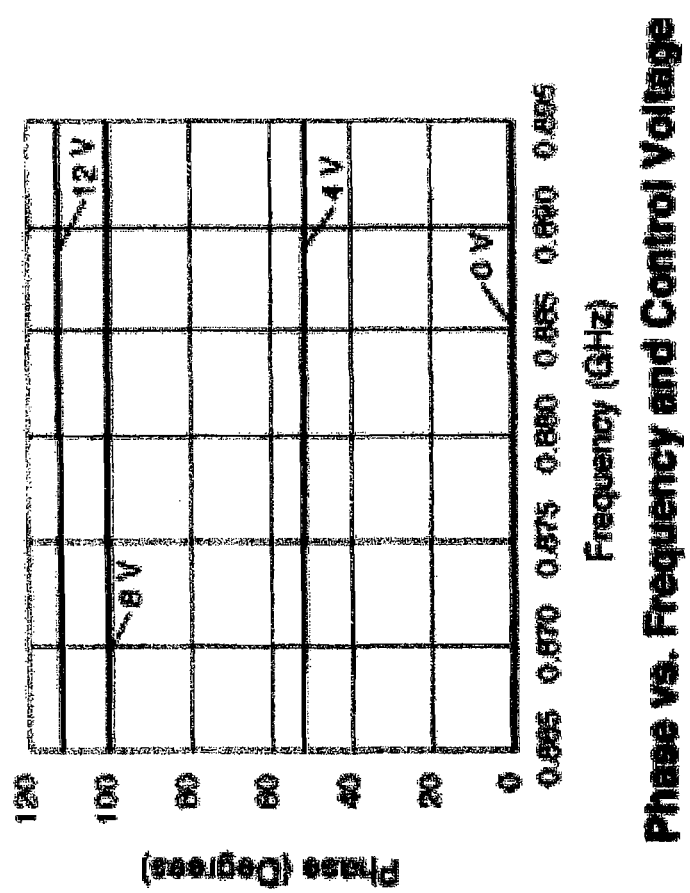
FIG. 6 shows the transfer function and dispersion characteristics of an example phase shifter used in an RF-powered electrode-less plasma lamp according to an example embodiment.

In example embodiments, a signal can be generated by control electronics 132 to modulate the frequency of the RF power in the manner described above. In general, a sinusoidal signal whose frequency is swept in time in a sawtooth-wave fashion, as depicted in FIG. 4A, will in the frequency domain have the spectrum shown in FIG. 4B. In example embodiments, the sawtooth frequency-sweep is effective in minimizing the peaks in the resulting spectrum for a given total power. FIG. 5A shows an alternative frequency sweep that may be used in some embodiments, in which more time is spent at the frequency-sweep inflection points. The corresponding spectrum is shown in FIG. 5B, in which it is seen that peaks develop corresponding to the extra dwell-time. In example embodiments, the modulation may occur almost continuously over the period of the frequency sweep signal. In some examples, the frequency of the signal may be in the range of from 1-100 KHz or any range subsumed therein. In some examples, the frequency of the modulation signal is in the range of about 20-30 KHz. The period of the signal may be in the range of about 10 microseconds to 1 millisecond or any range subsumed therein.

In example embodiment, a frequency sweep signal may be applied to modulate the frequency of RF power applied to an RF powered electrodeless plasma lamp. In the example of FIG. 1A, the frequency may be modulated by adjusting the phase shift in a feedback loop in lamp drive circuit 106. Other methods for modulating frequency may be used in other embodiments.

In the example of FIG. 1A, a feedback probe 122 samples power from the lamp body 102 and provide it as feedback to the lamp drive circuit 106. The feedback probe 122 is coupled to the input of the amplifier 124 through an attenuator 128 and phase shifter 130. The attenuator 128 is used to adjust the power of the feedback signal to an appropriate level for input to the phase shifter 130. In some embodiments, a second attenuator may be used between the phase shifter 130 and the amplifier 124 to adjust the power of the signal to an appropriate level for amplification by the amplifier 124. In some embodiments, the attenuator(s) may be variable attenuators controlled by the control electronics 132. In other embodiments, the attenuators may be set to a fixed value. In some embodiments, the lamp drive circuit may not include an attenuator. In an example embodiment, the phase shifter 130 may be a voltage-controlled phase shifter controlled by the control electronics 132.

The feedback loop automatically oscillates at a frequency based on the load conditions and phase of the feedback signal. This feedback loop may be used to maintain a resonant condition in the lamp body 102 even though the load conditions change as the plasma is ignited and the temperature of the lamp changes. If the phase is such that constructive interference occurs for waves of a particular frequency circulating through the loop, and if the total response of the loop (including the amplifier, lamp, and all connecting elements) at that frequency is such that the wave is amplified rather than attenuated after traversing the loop, the loop will oscillate at that frequency. Whether a particular setting of the phase-shifter induces constructive or destructive feedback depends on frequency. The phase-shifter 128 can be used to finely tune the frequency of oscillation within the range supported by the lamp's frequency response. In doing so, it also effectively tunes how well RF power is coupled into the lamp because power absorption is frequency-dependent.

In this example, the phase shift of the phase shifter may be controlled in order to modulate the RF power frequency to spread the spectrum and reduce peak EMI. A control voltage signal for the phase shifter 130 may be generated by the control electronics 132 and applied to the phase shifter 130 to control the amount of phase shift and, in turn, the frequency of oscillation. An example phase shifter 130 is the PS088-315 voltage-controlled phase-shifter available commercially from Skyworks Solutions Inc. of Woburn, Mass. An example transfer function for a suitable phase shifter is shown in FIG. 7, in which a phase shift is induced as a function of control voltage, over an operating range in this case of 865-895 MHz. In an example embodiment, the phase shifts by about 10 degrees per volt. In example embodiments, the phase control signal may be modulated by a signal of the shape shown in FIG. 4A or 5A providing a peak to peak modulation of about 1-2 volts. The frequency of the modulation signal may be high in order to rapidly modulate the frequency of the RF power. In example embodiments, the frequency of the modulation signal may be in the range of from 1 KHz to 100 KHz or any range subsumed therein. In example embodiments, the phase of the phase shifter is adjusted almost continuously across the period of the frequency sweep signal and smoothly spreads the frequency across a wider bandwidth.

Figure 7B:
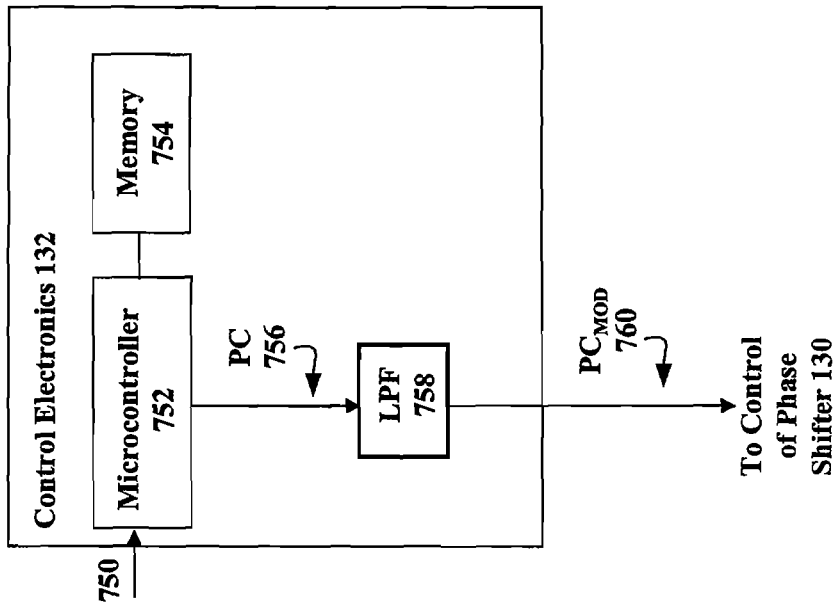
FIG. 7B shows a block diagram of control electronics for an RF-powered electrode-less lamp using a second method of implementing the spread-spectrum frequency sweep.
Figure 7A:
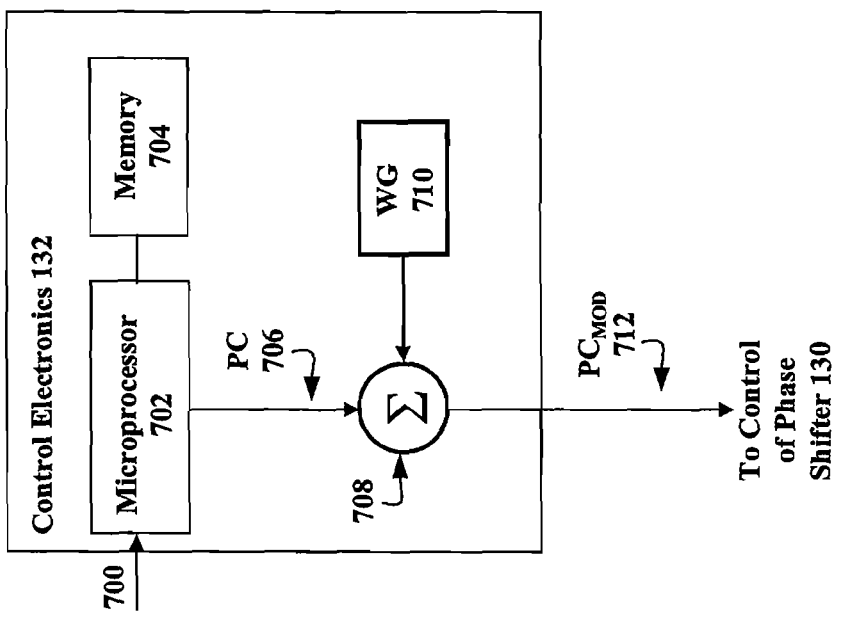
FIG. 7A shows a block diagram of control electronics for an RF-powered electrode-less lamp using a first method of implementing a spread-spectrum frequency sweep.

FIG. 7A shows a block diagram of control electronics 132 for an RF-powered electrode-less lamp using a first method for generating a modulated phase control signal to implement a spread-spectrum frequency sweep. In FIG. 7A, microprocessor 702 issues a phase-control voltage signal (PC) 706 which may be intended to control the brightness of the lamp. The desired brightness may be determined based on inputs 700 provided to the microprocessor 702 from the system. These inputs may include lamp operating conditions, such as a signal from light sensor 134 or power sensor 136, and/or brightness control signals from the system in which the lamp is used. In some embodiments, the voltage levels to be used for a particular phase adjustment may be stored in memory 704 or may be calculated by microprocessor 702. In other embodiments, the phase may be automatically adjusted in increments until a desired lamp operating condition is detected. The desired phase control signal 706 is then provided to a summing buffer 708. The summing buffer sums the phase control signal 706 with the output of waveform generator (WG) 710. In this example, the waveform generator 710 generates a sawtooth voltage signal similar to that shown in FIG. 4A. In some embodiments, the peak to peak modulation of the sawtooth voltage signal is in the range of about 1-2 volts. The summed signal ($PC_{MOD}$) 712 is then provided to the control pin of the phase-shifter 130, which modulates the frequencies in the loop accordingly.

FIG. 7B shows a block diagram of control electronics for an RF-powered electrode-less lamp using a second method for generating a modulated phase control signal to implement a spread-spectrum frequency sweep. In the example shown in FIG. 7B, a low cost microcontroller 752 is used in the control electronics 132, although microprocessors or other controllers may be used in other embodiments. As with FIG. 7A, the phase control signal (PC) 756 may be based on inputs to the microcontroller 752, which may include lamp operating conditions, such as a signal from light sensor 134 or power sensor 136, and/or brightness control signals from the system in which the lamp is used. In some embodiments, the voltage levels to be used for a particular phase adjustment may be stored in memory 704 or may be calculated by microcontroller 752. Microcontroller 752 may generate control voltages using Pulse Width Modulation (PWM) instead of a more expensive Digital to Analog Converter (DAC). The PWM signal generated by the micro-controller is a square-wave whose duty-cycle is proportional to the voltage to be generated. In this example, the frequency of the square-wave is dependent on the micro-controller's clock frequency and one or more software-selected divisor. In example embodiments, an external low-pass filter (LPC) 758 removes the high-order harmonics of the square wave, leaving behind the desired DC component. In this example, the low pass filter 758 may have its pass-band shape and corner frequency designed such that higher-order components of the square wave are permitted to pass, with their amplitudes filtered such that the surviving time-domain signal resembles the desired control signal of FIG. 4A. The resulting modulated phase control signal (PC-$_{MOD}$) 760 is then provided to the control pin of the phase-shifter 130, which modulates the frequencies in the loop accordingly.

FIGS. 8A, 8B and 8C show example changes in frequency band at the fundamental, third and fifth harmonics, respectively, of an RF-powered electrode-less lamp according to an example embodiment. In this example, a sawtooth modulated control signal is applied to the phase control to provide peak to peak modulation of about 2 volts. The spectrum without modulation is shown at 802A for the first harmonic, 802B for the third harmonic and 802C for the fifth harmonic. The spectrum with modulation is shown at 804A for the first harmonic, 804B for the third harmonic and 804C for the fifth harmonic. As shown in FIGS. 8A, 8B and 8C, the peak amplitude is decreased (which decreases EMI at a particular frequency) and the bandwidth is expanded, which allows sufficient average power to continue to be provided to the lamp. In the examples shown in FIGS. 8A, 8B and 8C, the vertical divisions indicate 10 dB per division and the horizontal divisions indicated 500 kHz per division. As shown in FIG. 8A, the peak amplitude is reduced by about 8-10 dB at the center frequency of 883 MHz and the bandwidth is spread from less than 1 MHz to more than 1 MHz. As shown in FIG. 8A, the resulting curve may be relatively flat across a broad bandwidth. For example, power may be provided to the lamp across a frequency band of greater than 750 KHz with less than +/−1 dB variation. In other embodiments, power may be provided to the lamp across a frequency band in the range of about 750 KHz to 3 MHz with less than +/−1 dB to 5 dB variation or any range subsumed therein, Additional aspect of the example lamp 100 shown in FIG. 1A will now be described. In FIG. 1A, control electronics 132 is connected to attenuator 128, phase shifter 130 and amplifier 124. The control electronics 132 provide signals to adjust the level of attenuation provided by the attenuator 128, phase of phase shifter 130, the class in which the amplifier 124 operates (e.g., Class A/B, Class B or Class C mode) and/or the gain of the amplifier 124 to control the power provided to the lamp body 102. In one example, the amplifier 124 has three stages, a pre-driver stage, a driver stage and an output stage, and the control electronics 132 provides a separate signal to each stage (drain voltage for the pre-driver stage and gate bias voltage of the driver stage and the output stage). The drain voltage of the pre-driver stage can be adjusted to adjust the gain of the amplifier. The gate bias of the driver stage can be used to turn on or turn off the amplifier. The gate bias of the output stage can be used to chose the operating mode of the amplifier (e.g., Class A/B, Class B or Class C). Control electronics 130 can range from a simple analog feedback circuit to a microprocessor/microcontroller with embedded software or firmware that controls the operation of the lamp drive circuit. The control electronics 130 may include a lookup table or other memory that contains control parameters (e.g., amount of phase shift or amplifier gain) to be used when certain operating conditions are detected. In example embodiments, feedback information regarding the lamp's light output intensity is provided either directly by an optical sensor 134, e.g., a silicon photodiode sensitive in the visible wavelengths, or indirectly by an RF power sensor 136, e.g., a rectifier. The RF power sensor 136 may be used to determine forward power, reflected power or net power at the drive probe 120 to determine the operating status of the lamp. A directional coupler may be used to tap a small portion of the power and feed it to the RF power sensor 136. An RF power sensor may also be coupled to the lamp drive circuit at the feedback probe 122 to detect transmitted power for this purpose. In some embodiments, the control electronics 132 may adjust the phase shifter 130 on an ongoing basis to automatically maintain desired operating conditions.

High frequency simulation software may be used to help select the materials and shape of the lamp body and electrically conductive coating to achieve desired resonant frequencies and field intensity distribution in the lamp body. Simulations may be performed using software tools such as HFSS, available from Ansoft, Inc. of Pittsburgh, Pa., and FEMLAB, available from COMSOL, Inc. of Burlington, Mass. to determine the desired shape of the lamp body, resonant frequencies and field intensity distribution. The desired properties may then be fine-tuned empirically.

While a variety of materials, shapes and frequencies may be used, one example embodiment has a lamp body 102 designed to operate in a fundamental TM resonant mode at a frequency of about 880 MHz (although the frequency may be spread across a spectrum to reduce EMI as described above and may also be adjusted based on load conditions or for brightness control). In this example, the lamp has an alumina lamp body 102 with a relative permittivity of 9.2. The lamp body 102 has a cylindrical outer surface as shown in FIG. 1B with a recess 118 formed in the bottom surface. In an alternative embodiment, the lamp body 102 may have a rectangular outer surface. The outer diameter D1 of the lamp body 102 in FIG. 1B is about 40.75 mm and the diameter D2 of the recess 118 is about 8 mm. The lamp body has a height H1 of about 17 mm. A narrow region 112 forms a shelf over the recess 118. The thickness H2 of the narrow region 112 is about 2 mm. As shown in FIG. 1A, in this region of the lamp body 102 the electrically conductive surfaces on the lamp body are only separated by the thin region 112 of the shelf. This results in higher capacitance in this region of the lamp body and higher electric field intensities. This shape has been found to support a lower resonant frequency than a solid cylindrical body having the same overall diameter D1 and height H1 or a solid rectangular body having the same overall width and height. For example, in some embodiments, the relative permittivity is in the range of about 9-15 or any range subsumed therein, the frequency of the RF power is less than about 1 GHz and the volume of the lamp body is in the range of about 10 cm³ to 30 cm³ or any range subsumed therein.

In this example, a hole 110 is formed in the thin region 112. The hole has a diameter of about 5.5 mm and the bulb has an outer diameter of about 5 mm. The shelf formed by the thin region 112 extends radially from the edge of the hole 110 by a distance D3 of about 1.25 mm. Alumina powder is packed between the bulb and the lamp body and forms a layer having a thickness D5 of about ¼ mm. The bulb 104 has an outer length of about 15 mm and an interior length of about 9 mm. The interior diameter at the center is about 2.2 mm and the side walls have a thickness of about 1.4 mm. The bulb protrudes from the front surface of the lamp body by about 4.7 mm. The bulb has a fill of Argon, $Kr_{85}$, Mercury and Indium Bromide. The pressure of the noble gas may be 400 Torr or more to reduce warm up times. This pressure is measured at 22° C. (room temperature). It is understood that much higher pressures are achieved at operating temperatures after the plasma is formed. For example, the lamp may provide a high intensity discharge at high pressure during operation (e.g., much greater than 2 atmospheres and 10-30 atmospheres or more in example embodiments).

In this example, the drive probe 120 is about 15 mm long with a diameter of about 2 mm. The drive probe 120 is about 7 mm from the central axis of the lamp body and a distance D4 of about 3 mm from the electrically conductive material 108 on the inside surface of recess 118. The relatively short distance from the drive probe 120 to the bulb 104 enhances coupling of power. The feedback probe 122 is a distance D6 of about 11 mm from the electrically conductive material 108. In one example, a 15 mm hole is drilled for the feedback probe 122 to allow the length and coupling to be adjusted. The unused portion of the hole may be filled with PTFE (Teflon) or another material. In this example, the feedback probe 122 has a length of about 3 mm and a diameter of about 2 mm. In another embodiment where the length of the hole matches the length of the feedback probe 122, the length of the feedback probe 122 is about 1.5 mm.

The above dimensions, shape, materials and operating parameters are examples only and other embodiments may use different dimensions, shape, materials and operating parameters.

What is claimed is:
1. An electrodeless plasma lamp comprising:
   a lamp body comprising a dielectric material having a relative permittivity greater than 2;
   a lamp drive circuit coupled to the lamp body and configured to provide radio frequency (RF) power to the lamp body at RF power frequency, the RF power frequency being at least proximate a resonant frequency for the lamp body; and
   a bulb adjacent to the lamp body, the bulb containing a fill that forms a plasma when the RF power is coupled to the fill from the lamp body,
   the lamp drive circuit including a modulation control circuit to control modulation of the RF power frequency across a frequency band, wherein the frequency band is around the resonant frequency and the modulation is configured to reduce a peak amplitude of the RF power while maintaining average power to the plasma.
2. The electrodeless plasma lamp of claim 1, wherein the modulation control circuit is configured to reduce an amplitude at each of a plurality of spectral components and increase a bandwidth of each spectral component relative to when the RF power is unmodulated.

3. The electrodeless plasma lamp of claim 1, wherein the frequency band is within 50 MHz of the resonant frequency, the resonant frequency being at a resonant mode for the lamp body.
4. The electrodeless plasma lamp of claim 3, wherein the resonant mode is the fundamental resonant mode for the lamp body.
5. The electrodeless plasma lamp of claim 1, wherein the lamp body forms a resonant structure comprising a conductive material, the modulation control circuit being configured to modulate the RF power frequency across a frequency band within 50 MHz of the resonant frequency for the resonant structure.
6. The electrodeless plasma lamp of claim 5, wherein the resonant frequency is the frequency for a fundamental resonant mode for the resonant structure.
7. The electrodeless plasma lamp of claim 1, wherein the frequency band has a bandwidth greater than 750 kHz.
8. The electrodeless plasma lamp of claim 1, wherein the frequency band has a bandwidth greater than 1 MHz.
9. The electrodeless plasma lamp of claim 1, wherein the modulation circuit controls the lamp drive circuit to modulate the RF power frequency across the frequency band, the frequency band being in the range of 1-10 MHz.
10. The electrodeless plasma lamp of claim 1, wherein the frequency band is in the range of 1-3 MHz.
11. The electrodeless plasma lamp of claim 1, wherein the lamp drive circuit includes a phase shifter configured to modulate the RF power frequency of the RF power under control of the modulation control circuit.
12. The electrodeless plasma lamp of claim 1, wherein the frequency band is at least 750 kHz with a variation of less than 1 dB.
13. The electrodeless plasma lamp of claim 1, wherein the frequency band is at least 1 MHz with a variation of less than 3 dB.
14. The electrodeless plasma lamp of claim 1, wherein a peak amplitude of the RF power is reduced by more than 8 dB relative to a peak amplitude that would occur in the absence of modulation of the RF power frequency of the RF power.
15. The electrodeless plasma lamp of claim 1, wherein the the dielectric material has a volume in the range of 10 cm³ to 30 cm³.
16. The electrodeless plasma lamp of claim 1, wherein the modulation control circuit generates a frequency sweep signal to modulate the RF power frequency of the RF power across the frequency band.
17. The electrodeless plasma lamp of claim 16, wherein the frequency sweep signal is a sawtooth signal or a sinusoidal signal.
18. The electrodeless plasma lamp of claim 1, wherein the modulation controls circuit comprises:
   memory to store control parameters; and
   a processor connected to the memory, the processor controlling the RF power frequency of the RF power provided to the lamp body based on the control parameters.
19. A method of reducing electromagnetic interference in an electrodeless plasma lamp, the method comprising:
   providing a lamp body, a bulb including a fill, and an RF power source;
   coupling power from the RF power source to the lamp body to provide power to the fill to form a light emitting plasma, the power being at RF power frequency being at least proximate a resonant frequency for the lamp body; and
   modulating the RF power frequency of the RF power across a frequency band, wherein the frequency band is around the resonant frequency and the modulation is configured to reduce peak amplitude while maintaining average power to the plasma.

20. An electrodeless plasma lamp comprising:
a lamp body comprising a dielectric material having a relative permittivity greater than 2;
a bulb adjacent to the lamp body, the bulb containing a fill that forms a plasma when RF power is coupled to the fill from the lamp body; and
a lamp drive circuit to couple power into the lamp body, the lamp drive circuit configured to provide RF power at a RF power frequency that is modulated across a frequency band, wherein the frequency band is around a resonant frequency for the lamp body and the modulation is configured to reduce peak amplitude—while maintaining average power to the plasma.

21. The electrodeless plasma lamp of claim 1, wherein the lamp drive circuit is configured to modulate the power so that a peak amplitude of the power is reduced by 1-12 dB while maintaining the average power.

22. The electrodeless plasma lamp of claim 1, wherein the frequency band is within the resonant bandwidth for the lamp body, the resonant bandwidth being the full frequency width at half of a maximum power from the lamp drive circuit.

23. The electrodeless plasma lamp of claim 1, wherein the lamp drive circuit is configured to modulate the RF power frequency so that the RF power is spread over by 1-10% of the unmodulated harmonic frequency.

24. An electrodeless plasma lamp comprising:
a lamp body comprising a dielectric material having a relative permittivity greater than 2;
a lamp drive circuit coupled to the lamp body and configured to provide radio frequency (RF) power to the lamp body at RF power frequency, the RF power frequency being at least proximate a resonant frequency for the lamp body; and
a bulb adjacent to the lamp body, the bulb containing a fill that forms a plasma when the RF power is coupled to the fill from the lamp body,
the lamp drive circuit including a modulation control circuit to control modulation of the RF power frequency across a frequency band, wherein the frequency band is around the resonant frequency and the modulation is configured to sweep the RF power frequency across the frequency band during operation of the plasma lamp to reduce a peak amplitude of the RF power while maintaining average power to the plasma.

* * * * *